United States Patent
Shih et al.

(10) Patent No.: US 9,509,921 B2
(45) Date of Patent: *Nov. 29, 2016

(54) VIDEO PROCESSING CIRCUIT AND RELATED METHOD FOR MERGING VIDEO OUTPUT STREAMS WITH DATA STREAM FOR TRANSMISSION

(71) Applicant: MEDIATEK INC., Hsin-Chu (TW)

(72) Inventors: Yang-Hung Shih, Hsinchu (TW); Hung-Der Lin, Hsinchu (TW); Tang-Hung Po, Pingtung County (TW); Sau-Kwo Chiu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/807,900

(22) Filed: Jul. 24, 2015

(65) Prior Publication Data

US 2015/0334312 A1 Nov. 19, 2015

Related U.S. Application Data

(63) Continuation-in-part of application No. 13/907,983, filed on Jun. 3, 2013, now Pat. No. 9,137,458, which is a continuation of application No. 12/276,422, filed on Nov. 24, 2008, now abandoned.

(51) Int. Cl.
| | |
|---|---|
| H04N 7/12 | (2006.01) |
| H04N 5/265 | (2006.01) |
| H04N 19/44 | (2014.01) |
| H04N 5/445 | (2011.01) |
| H04N 7/08 | (2006.01) |
| H04N 21/431 | (2011.01) |
| H04N 21/44 | (2011.01) |

(52) U.S. Cl.
CPC .......... *H04N 5/265* (2013.01); *H04N 5/44508* (2013.01); *H04N 7/0806* (2013.01); *H04N 19/44* (2014.11); *H04N 21/431* (2013.01); *H04N 21/44016* (2013.01)

(58) Field of Classification Search
CPC ........... H04N 5/265; H04N 21/44016; H04N 21/431; H04N 7/0806; H04N 5/44508; H04N 19/44
USPC .................................................... 375/240.26
See application file for complete search history.

(56) References Cited

U.S. PATENT DOCUMENTS

| | | |
|---|---|---|
| 6,519,283 B1 | 2/2003 | Cheney |
| 6,570,626 B1 | 5/2003 | Mendenhall |

(Continued)

*Primary Examiner* — Allen Wong

(74) *Attorney, Agent, or Firm* — Winston Hsu; Scott Margo

(57) ABSTRACT

A video processing circuit includes a video generating unit for generating a video output stream, a data generating unit (e.g. graphic generating unit) for providing a data stream (e.g. graphical stream), and a communication interface circuit. The communication interface circuit has a mode provided for merging the video output stream and the graphical stream to transmit a first merged signal through a channel. In the mode, the communication interface circuit merges the video output stream and the data stream by increasing a working frequency of the communication interface circuit to increase bandwidths of the channel, using positions for transmitting a portion of video control signals in the video output stream to transmit the data stream, and compressing the video output stream. The communication interface circuit may have another mode provided for mixing the video output stream and the data stream to transmit a mixed video output stream through the channel.

23 Claims, 12 Drawing Sheets

(56) References Cited

U.S. PATENT DOCUMENTS

| | | |
|---|---|---|
| 7,373,431 B2 | 5/2008 | Kondo |
| 7,411,613 B2 | 8/2008 | Honma |
| 7,548,586 B1 | 6/2009 | Mimar |
| 2001/0022889 A1 | 9/2001 | Ohta |
| 2002/0126703 A1 | 9/2002 | Kovacevic |
| 2003/0085903 A1 | 5/2003 | Hrusecky |
| 2004/0109504 A1 | 6/2004 | Seo |
| 2006/0187354 A1 | 8/2006 | Kawamura |
| 2008/0239149 A1 | 10/2008 | Lai |
| 2008/0247455 A1 | 10/2008 | Lin |
| 2009/0043928 A1 | 2/2009 | Lou |
| 2011/0179451 A1 | 7/2011 | Miles |

VIDEO PROCESSING CIRCUIT AND RELATED METHOD FOR MERGING VIDEO OUTPUT STREAMS WITH DATA STREAM FOR TRANSMISSION

CROSS REFERENCE TO RELATED APPLICATION

This application is a continuation in part of U.S. non-provisional application Ser. No. 13/907,983, which was filed on Jun. 3, 2013 and is incorporated herein by reference. The U.S. non-provisional application Ser. No. 13/907,983 is a continuation of U.S. non-provisional application Ser. No. 12/276,422, which was filed on Nov. 24, 2008.

BACKGROUND

The present disclosure relates to a video processing circuit and related method thereof, and more particularly, to a processing circuit and related method for merging video output streams with a data stream (e.g. a graphical stream) for transmission.

In a typical digital TV chip application, auxiliary graphics, e.g. on screen display (OSD) information, are usually overlaid on video output streams as user interfaces or user menus. Generally, the graphics and the video output streams are mixed into a single mixed data by a conventional mixer, and the mixed data is then transmitted to a display panel for further display. Please refer to FIG. 1. FIG. 1 is a diagram of a first conventional video processing circuit 100. The video processing circuit 100 includes a video processing chip 110 and a video output device 130, whereof the video processing chip 110 includes a video generating unit 112, an OSD encoder 114, a mixer 116, and a first signal transmitter 118. The generating unit 112 is utilized for generating a video output stream $S_{OUT}$ according to a video input stream $S_{IN}$. The OSD encoder 114 is utilized for generating an encoded auxiliary graphic data $D_1$. The mixer 116 is coupled to the video generating unit 112 and the OSD encoder 114 for mixing the video output stream $S_{OUT}$ with the graphic data $D_1$ to generate a single mixed data $D_{MIX}$, and then the first signal transmitter 118 transmits the mixed data $D_{MIX}$ to the video output device 130 through a low voltage differential signal (LVDS) interface. More particularly, the video processing chip 110 is a TV chip installed in a digital TV, and the video output device can be a recorder or a flat panel display (FPD), such as a plasma panel.

In order to enhance video quality, a post-processing chip is necessary for the typical digital TV chip application. Please refer to FIG. 2. FIG. 2 is a diagram of a second conventional video processing circuit 200. In FIG. 2, elements with the same reference numerals as that in FIG. 1 refer to the same elements, and further detailed description is omitted herein for brevity. The difference between the video processing circuit 200 and the video processing circuit 100 is that the video processing circuit 200 further includes a video post-processing chip 220 coupled between the video processing chip 110 and the video output device 130. The video post-processing chip 22 includes a first signal receiver 222, a video post-processing unit 224, and a second signal transmitter 226. The first signal receiver 222 is coupled to the first signal transmitter 118 for receiving the mixed data $D_{MIX}$, and the video post-processing unit 224 is coupled to the first signal receiver 222 for receiving and post-processing the mixed data $D_{MIX}$ to generate a processed mixed data $D_{PMIX}$. Then, the second signal transmitter 226 transmits the processed mixed data $D_{PMIX}$ to the video output device 130 through a low voltage differential signal (LVDS) interface.

Due to the video output stream $S_{OUT}$ being mixed with the auxiliary graphic data $D_1$ to generate the mixed data $D_{MIX}$, both the video output stream $S_{OUT}$ and the graphic data $D_1$ are post-processed by the video post-processing unit 224 by the same scheme for enhancing the video quality thereof. Thus the quality around edges of the graphic data $D_1$ area may be poor as the video enhancement is applied to the mixed data $D_{MIX}$ including contents of the graphic data $D_1$ which replace an overlapped portion within the contents originally carried by the video output stream $S_{OUT}$ and are far different from remaining contents corresponding to the video output stream $S_{OUT}$.

Please refer to FIG. 3. FIG. 3 is a diagram of a third conventional video processing circuit 300. In FIG. 3, elements with the same reference numerals as that in FIG. 2 refer to the same elements, and further detailed description is omitted herein for brevity. Also, the video processing circuit 300 includes a video processing chip 310, a video post-processing chip 320, and the video output device 130. The differences between the video processing circuit 300 in FIG. 3 and the video processing circuit 200 in FIG. 2 are described in the following. During the operation of the video processing chip 310, the video output stream $S_{OUT}$ and the graphic data $D_1$ are not mixed and are respectively transmitted to the first signal transmitter 118. At this time, only the video output stream $S_{OUT}$ is post-processed by the video post-processing unit 224 to generate a processed video output stream $S_{POUT}$ for enhancing the video quality. The graphic data $D_1$ is directly transmitted to a mixer 318 without being post-processed by the video post-processing unit 224. Afterwards, the processed video output stream $S_{POUT}$ and the graphic data $D_1$ are mixed by the mixer 318 to generate a second mixed signal $D_{PMIX2}$. In this situation, as the whole video contents carried by the video output stream $S_{OUT}$ undergo the video enhancement processing before mixed with the auxiliary graphic data $D_1$, the quality around edges of the graphic data $D_1$ area can be improved but extra I/O pins are needed to transmit the graphic data $D_1$ to the first signal receiver 222.

Presently, most video processing circuits often add a post-processing chip to enhance the video quality. However, if the video output stream $S_{OUT}$ and the graphic data $D_1$ are mixed during the operation of the video processing chip, both the video output stream $S_{OUT}$ and the graphic data $D_1$ are post-processed by the video post-processing chip, resulting in a poor quality around the graphic data $D_1$ area as the mixing process occurs prior to the post-processing process. If the video output stream $S_{OUT}$ and the graphic data $D_1$ are mixed during the operation of the video post-processing chip (i.e., the post-processing process occurs prior to the mixing process), only the video output stream $S_{OUT}$ is post-processed by the video post-processing chip for enhancing the video quality. The disadvantage of this case is that extra I/O pins are needed to transmit the graphic data $D_1$, which is not economical for cost.

SUMMARY

It is one of the objectives of the claimed disclosure to provide a video processing circuit and related method for merging video output streams with a data stream (e.g. a graphical stream) for transmission, thereby reducing the number of pins assigned for transmitting the main video data (e.g., display data) and the auxiliary video data (e.g., OSD data).

According to an embodiment of the present disclosure, a video processing circuit is disclosed. The video processing circuit includes a video generating unit, a data generating unit (e.g. a graphic generating unit), and a communication interface circuit. The video generating unit generates a video output stream according to a video input stream. The data generating unit (e.g. the graphic generating unit) provides a data stream (e.g. a graphical stream). The communication interface circuit is coupled to the video generating unit and the data generating unit. The communication interface circuit has a mode (e.g. a second mode) provided for merging the video output stream and the data stream to transmit a first merged signal through a channel, wherein in the mode, a first part of bandwidth of the channel is utilized for transmitting the video output stream and a second part of bandwidth of the channel is utilized for transmitting the data stream; wherein in the mode, the communication interface circuit merges the video output stream and the data stream by compressing the video output stream. For example, the communication interface circuit may have another mode (e.g. a first mode) provided for mixing the video output stream and the data stream to transmit a mixed video output stream through the channel, wherein in the other mode, bandwidth of the channel is used for transmitting the mixed video output stream.

According to an embodiment of the present disclosure, a video processing circuit is disclosed. The video processing circuit includes a video generating unit, a data generating unit (e.g. a graphic generating unit), and a communication interface circuit. The video generating unit generates a video output stream according to a video input stream. The data generating unit (e.g. the graphic generating unit) provides a data stream (e.g. a graphical stream). The communication interface circuit is coupled to the video generating unit and the data generating unit. The communication interface circuit has a mode (e.g. a second mode) provided for merging the video output stream and the data stream to transmit a first merged signal through a channel, wherein in the mode, a first part of bandwidth of the channel is utilized for transmitting the video output stream and a second part of bandwidth of the channel is utilized for transmitting the data stream; wherein in the mode, the communication interface circuit merges the video output stream and the data stream by increasing a working frequency of the communication interface circuit to increase a bandwidth of the channel. For example, the communication interface circuit may have another mode (e.g. a first mode) provided for mixing the video output stream and the data stream to transmit a mixed video output stream through the channel, wherein in the other mode, bandwidth of the channel is used for transmitting the mixed video output stream.

According to an embodiment of the present disclosure, a video processing circuit is disclosed. The video processing circuit includes a video generating unit, a data generating unit (e.g. a graphic generating unit), and a communication interface circuit. The video generating unit generates a video output stream according to a video input stream. The data generating unit (e.g. the graphic generating unit) provides a data stream (e.g. a graphical stream). The communication interface circuit is coupled to the video generating unit and the data generating unit. The communication interface circuit has a mode (e.g. a second mode) provided for merging the video output stream and the data stream to transmit a first merged signal through a channel, wherein in the mode, a first part of bandwidth of the channel is utilized for transmitting the video output stream and a second part of bandwidth of the channel is utilized for transmitting the data stream; wherein in the mode, the communication interface circuit merges the video output stream and the data stream by using positions for transmitting a portion of video control signals in the video output stream to transmit the data stream. For example, the communication interface circuit may have another mode (e.g. a first mode) provided for mixing the video output stream and the data stream to transmit a mixed video output stream through the channel, wherein in the other mode, bandwidth of the channel is used for transmitting the mixed video output stream.

It is an objective of the claimed disclosure to provide a method for merging video output streams with a graphical stream for transmission.

According to an embodiment of the present disclosure, a method for merging video output streams with a data stream (e.g. a graphical stream) for transmission is disclosed. The method includes generating a video output stream according to a video input stream, providing a data stream (e.g. a graphical stream), and providing a mode (e.g. a second mode) for merging the video output stream and the data stream to transmit a first merged signal to a post-processing chip through a channel, wherein in the mode, a first part of bandwidth of the channel is utilized for transmitting the video output stream and a second part of bandwidth of the channel is utilized for transmitting the data stream. For example, the method may further include providing another mode (e.g. a first mode) for mixing the video output stream and the data stream to transmit a mixed video output stream through the channel, wherein in the other mode, bandwidth of the channel is used for transmitting the mixed video output stream.

According to at least one embodiment of the present disclosure, in this mode, the step of merging the video output stream and the data stream may comprise using positions for transmitting a portion of video control signals in the video output stream to transmit the data stream.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
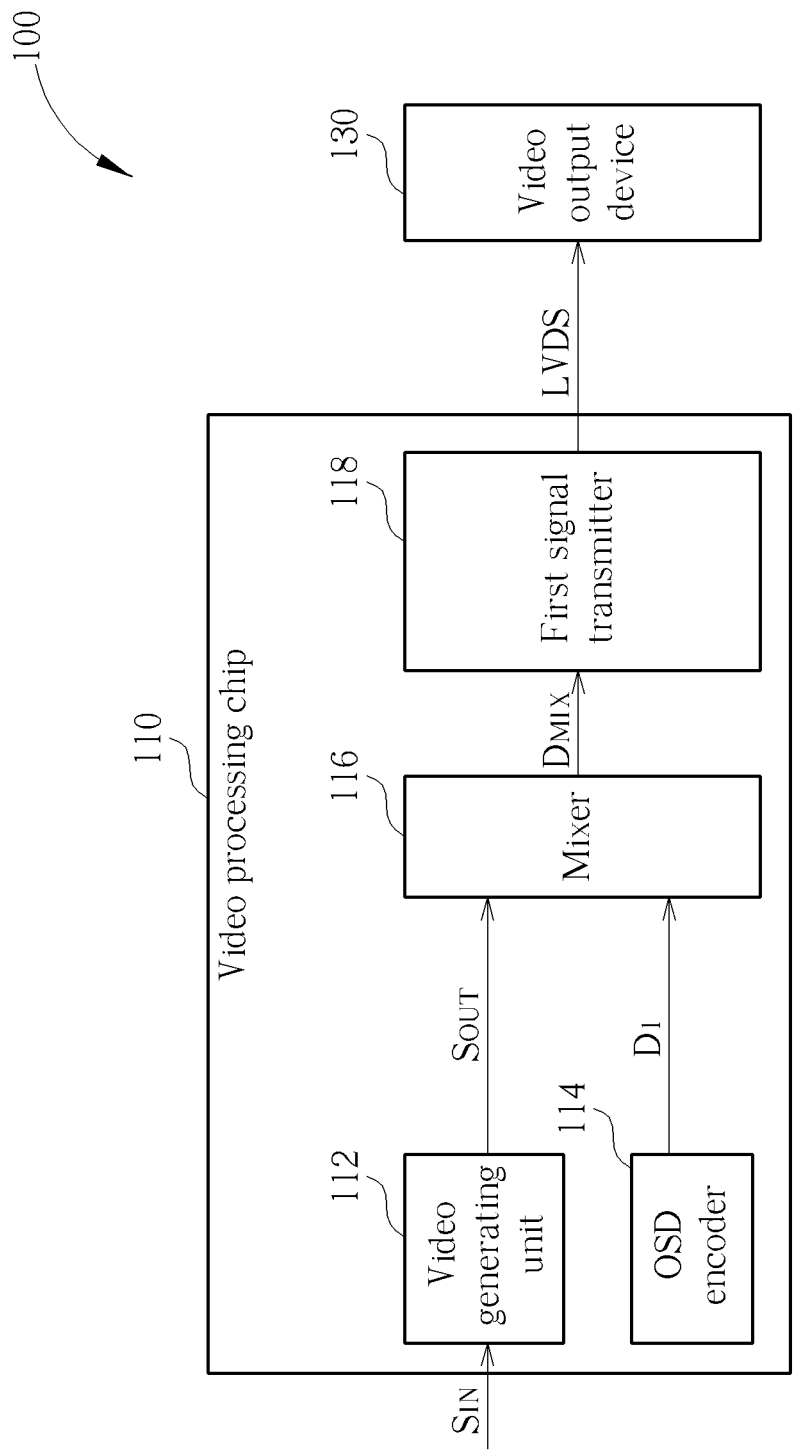
FIG. 1 is a diagram of a first conventional video processing circuit.
Figure 2:
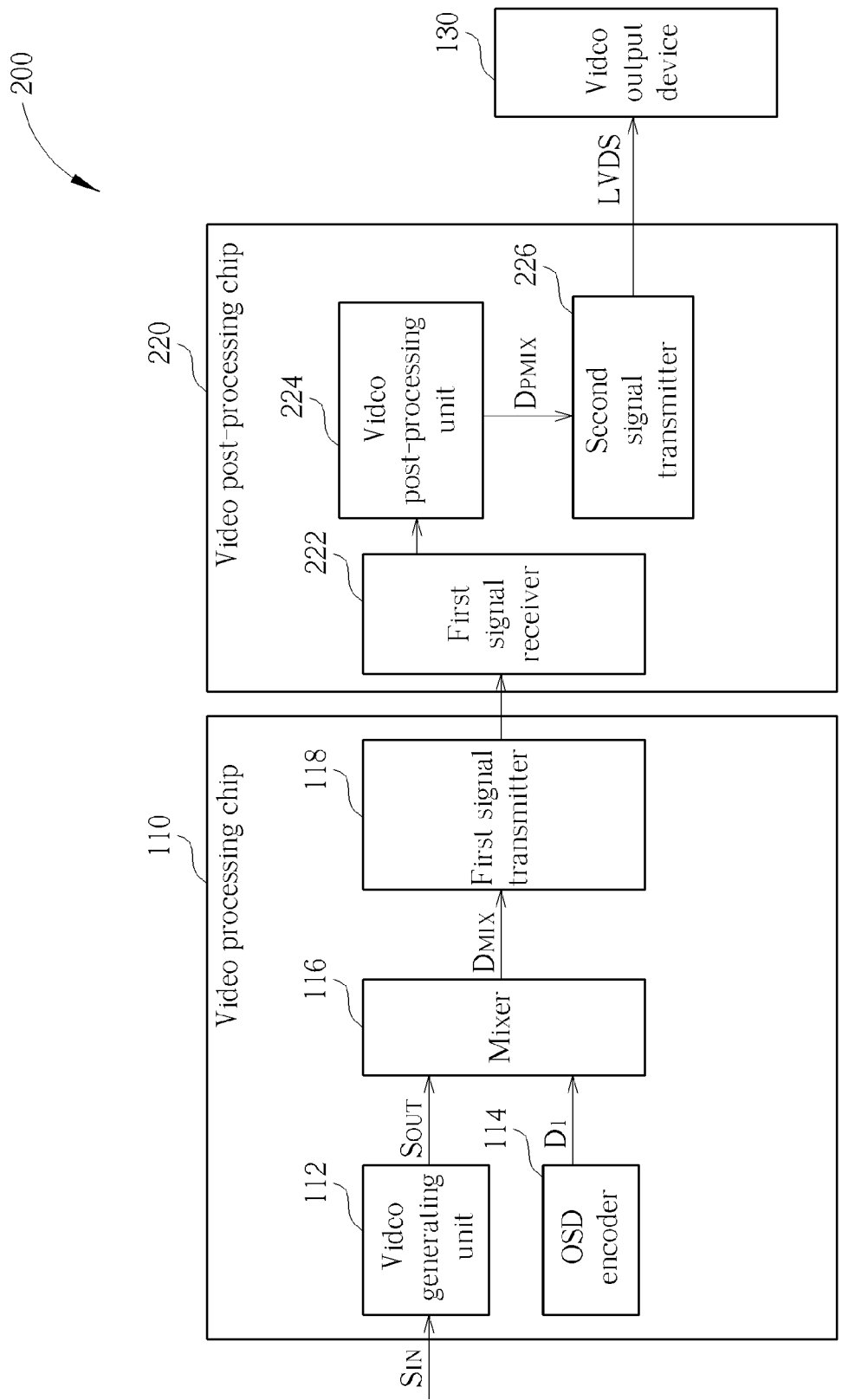
FIG. 2 is a diagram of a second conventional video processing circuit.
Figure 3:
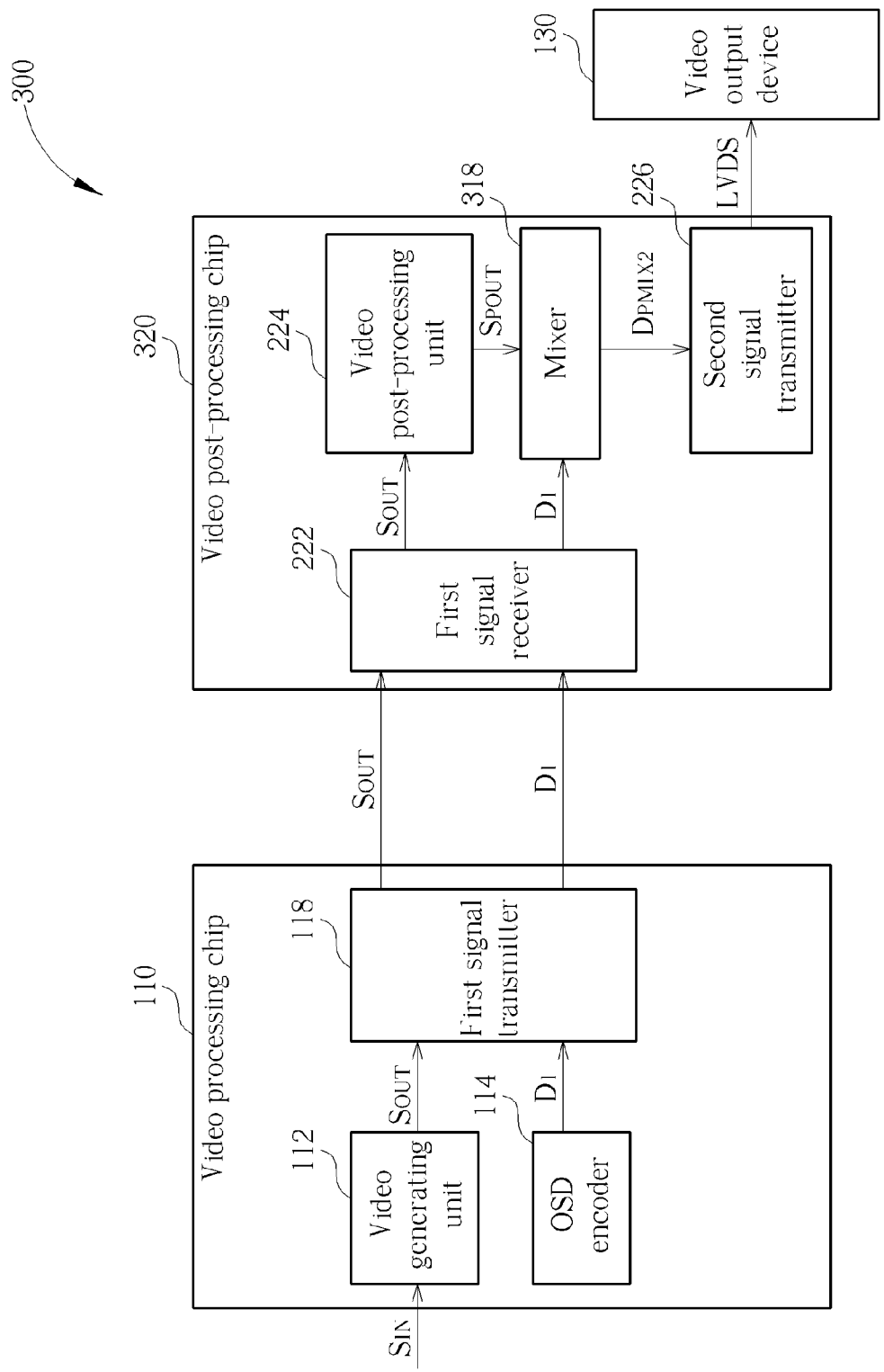
FIG. 3 is a diagram of a third conventional video processing circuit.
Figure 4:
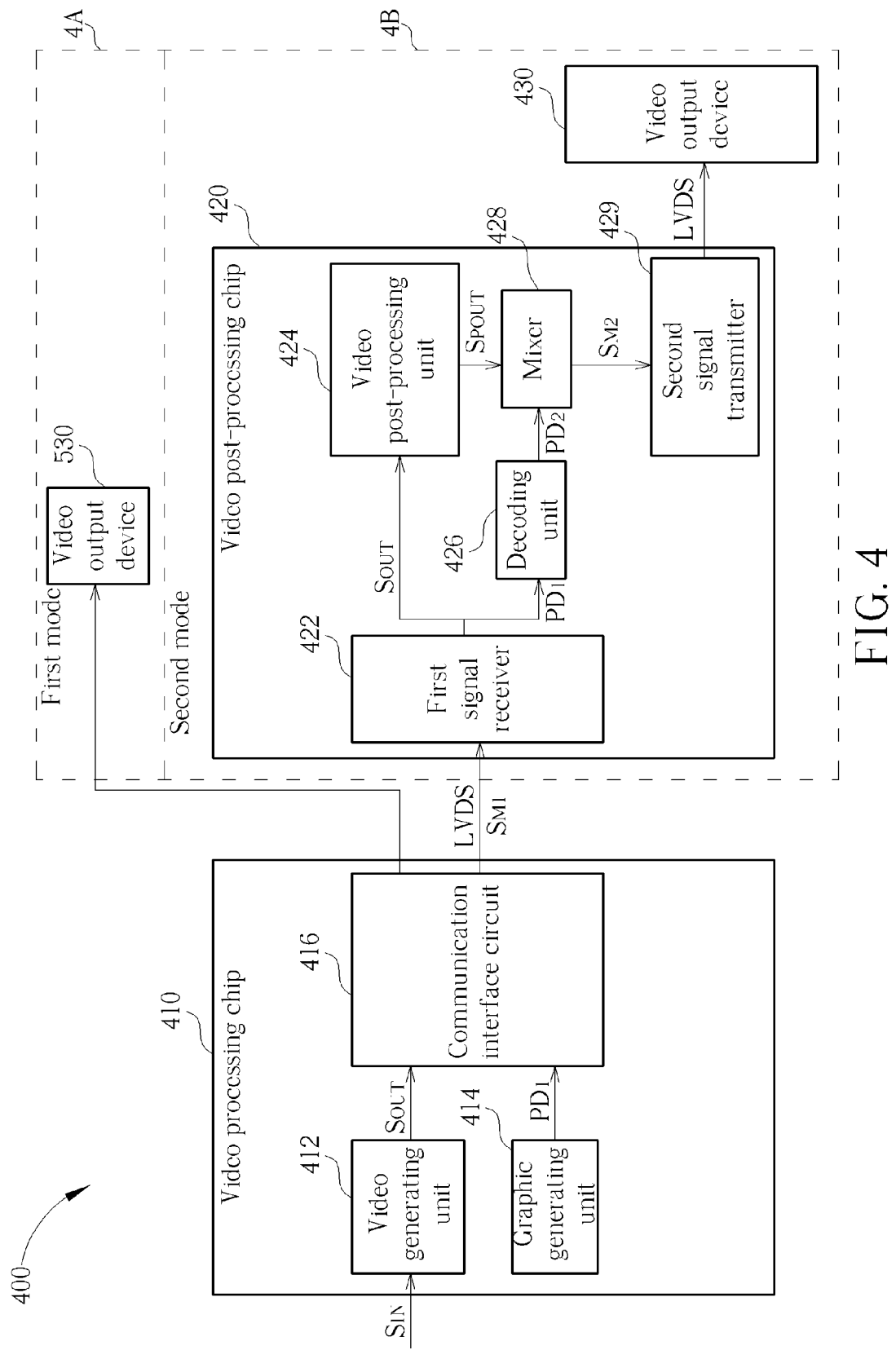
FIG. 4 is a diagram of a video processing circuit according to a first embodiment of the present disclosure.

Please refer to FIG. 4. FIG. 4 is a diagram of a video processing circuit 400 according to a first embodiment of the present disclosure. The video processing circuit 400 includes, but not limited to, a video processing chip 410, a video post-processing chip 420, and a video output device 430. In one embodiment, a video generating unit 412, a data generating unit such as a graphic generating unit 414, and a communication interface circuit 416 are disposed in the video processing chip 410; and a first signal receiver 422, a video post-processing unit 424, a decoding unit 426, a mixer 428, and a second signal transmitter 429 are disposed in the post-processing chip 420 coupled to the video processing chip 410.

Please continue referring to FIG. 4. The video generating unit 412 is utilized for generating a video output stream $S_{OUT}$ according to a video input stream $S_{IN}$, and the aforementioned data generating unit such as the graphic generating unit 414 is utilized for providing a data stream such as a graphical stream $PD_1$. The communication interface circuit 416 is coupled to the video generating unit 412 and to the graphic generating unit 414. The communication interface circuit 416 has a first mode (as shown in 4A) and a second mode (as shown in 4B). The first mode is provided for mixing the video output stream $S_{OUT}$ and the graphical stream $PD_1$ to transmit a mixed video output stream $S_{MOUT}$ through a channel LVDS and the second mode provided for merging the video output stream $S_{OUT}$ and the graphical stream $PD_1$ to transmit a first merged signal $S_{M1}$ through the channel LVDS, wherein the mixed video output stream $S_{MOUT}$ is generated by combining contents of the video output stream $S_{OUT}$ and the graphical stream $PD_1$ and the first merged signal $S_{M1}$ is generated by putting the video output stream $S_{OUT}$ and the graphical stream $PD_1$ in the channel LVDS. It should be note that the merging operation stated hereinafter is different from the aforementioned mixing operation as the merged result (e.g., the first merged signal $S_{M1}$) contains complete raw data of two input signals to be merged. In other words, the disclosed merging operation is to incorporate the graphical stream $PD_1$ into the video output stream $S_{OUT}$, rather than replacing an overlapped portion (e.g., the original video data corresponding to a display area overlaid by the OSD area) in the video output stream $S_{OUT}$ with the graphical stream $PD_1$.

As shown in 4A, the communication interface circuit 416 is in the first mode, whereof the first mode is provided for mixing the video output stream $S_{OUT}$ and the graphical stream $PD_1$ to transmit the mixed video output stream $S_{MOUT}$ through the channel LVDS. Under this situation, the video processing chip 410 is directly coupled to a video output device 530.

As shown in 4B, the communication interface circuit 416 is in the second mode, whereof the second mode provided for merging the video output stream $S_{OUT}$ and the graphical stream $PD_1$ to transmit a first merged signal $S_{M1}$ through the channel LVDS. After the signal merging, the first merged signal $S_{M1}$ is transmitted to the first signal receiver 422. The first signal receiver 422 receives the first merged signal $S_{M1}$ and extracts the video output stream $S_{OUT}$ and the graphical stream $PD_1$ from the first merged signal $S_{M1}$. The video post-processing unit 424 is coupled to the first signal receiver 422 for receiving and post-processing the video output stream $S_{OUT}$ extracted from the first merged signal $S_{M1}$ to generate a processed video output stream $S_{POUT}$. The decoding unit 426 is coupled to the first signal receiver 422 for decoding the graphical stream to generate a decoded graphical stream $PD_2$. At this time, the mixer 428 receives and mixes the processed video output stream $S_{POUT}$ with the decoded graphical stream $PD_2$ to generate a second merged signal $S_{M2}$. Finally, the second signal transmitter outputs the second merged signal $S_{M2}$ to the video output device 430 through a low voltage differential signal (LVDS) interface for display.

In one embodiment, the video processing circuit 400 is installed in a digital television (TV). It should be noted that although the video processing circuit 400 of this embodiment is installed in the digital TV as mentioned above, those skilled in the art will readily appreciate that the video processing circuit 400 can be applied to other products requiring similar video processing. Please note that, the video output device 430 can be a recorder or a flat panel display (FPD), such as a DVD recorder or a plasma panel.

In this embodiment, the second signal transmitter 429 is a low voltage differential signal (LVDS) transmitter, and the first signal receiver 422 is an LVDS receiver. Thus, the first merged signal $S_{M1}$ and the second merged signal $S_{M2}$ are transmitted through an LVDS interface, but this for illustrative purpose only and is not meant to be a limitation of the present disclosure. The first merged signal $S_{M1}$ and the second merged signal $S_{M2}$ can be transmitted through other interfaces, e.g. a transistor-transistor logic (TTL) interface, which is well-known to the one skilled in the art and is not described in detail herein.

Please note that, the graphic generating unit 414 can be an on-screen display (OSD) encoder disposed in the video processing chip 410 or an external storage device of the video processing chip 410, or other elements. Detail descriptions are disclosed in the following embodiments.

Figure 5:
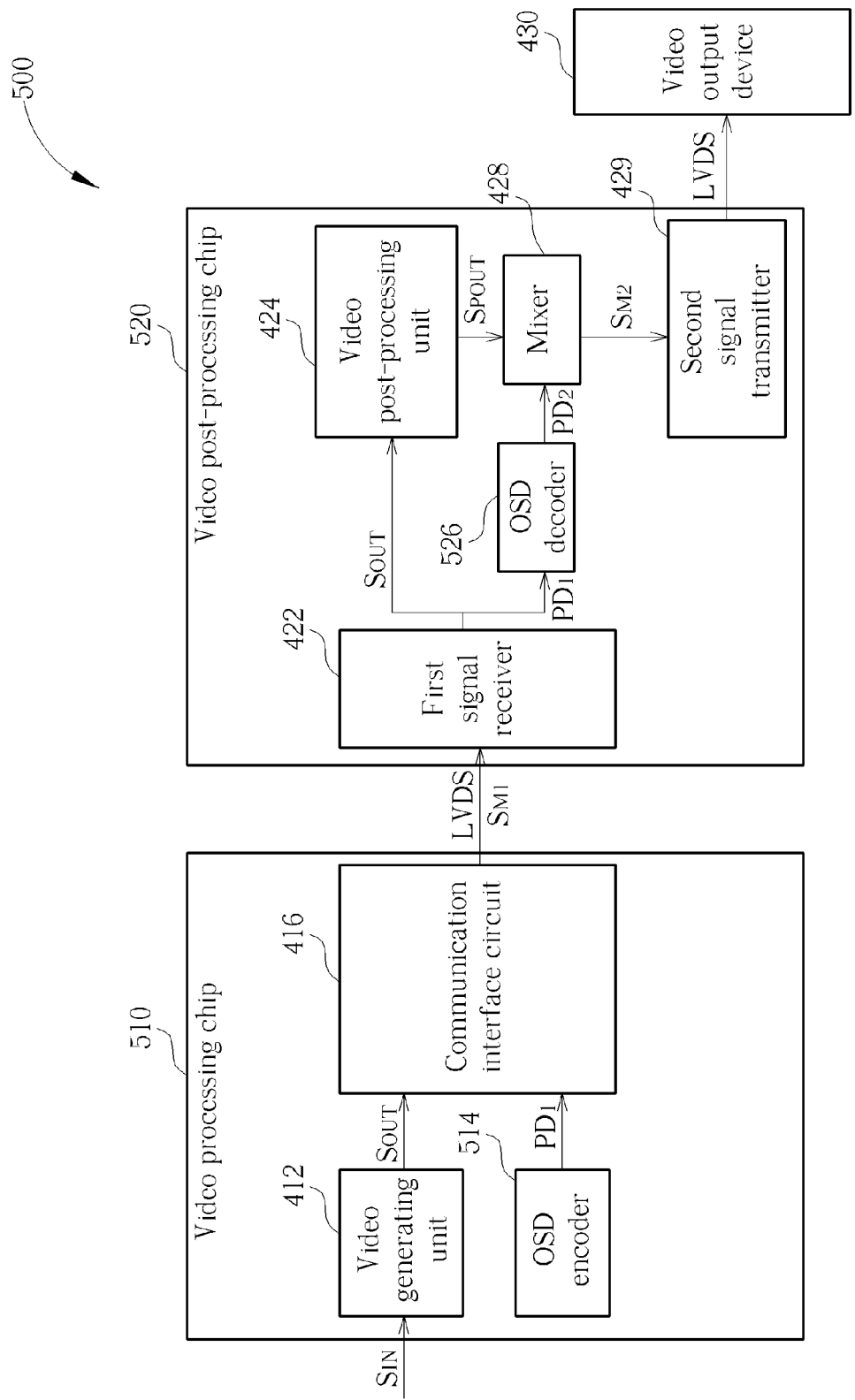
FIG. 5 is a diagram of a video processing circuit according to a second embodiment of the present disclosure.

Please refer to FIG. 5. FIG. 5 is a diagram of a video processing circuit 500 according to a second embodiment of the present disclosure. In FIG. 5, elements with the same reference numerals as that in FIG. 4 refer to the same elements, further detailed description is omitted herein. In this embodiment, the graphic generating unit is an OSD encoder 514 and is disposed in a video processing chip 510, and the decoding unit is an OSD decoder 526 disposed in a video post-processing chip 520. In this embodiment, the communication interface circuit 416 is in the second mode. The OSD encoder 514 generates the graphical stream $PD_1$ (that is to say an OSD data herein), and the communication interface circuit 416 then merges the video output stream $S_{OUT}$ and the graphical stream $PD_1$ (i.e., the OSD data) to generate a first merged signal $S_{M1}$. After the first signal receiver 422 receives the first merged signal $S_{M1}$ and extracts the video output stream $S_{OUT}$ and the graphical stream $PD_1$ (the OSD data) from the first merged signal $S_{M1}$, the OSD decoder 526 decodes graphical stream $PD_1$ (the OSD data) to generate the decoded graphical stream $PD_2$ (a decoded OSD data).

Figure 6:
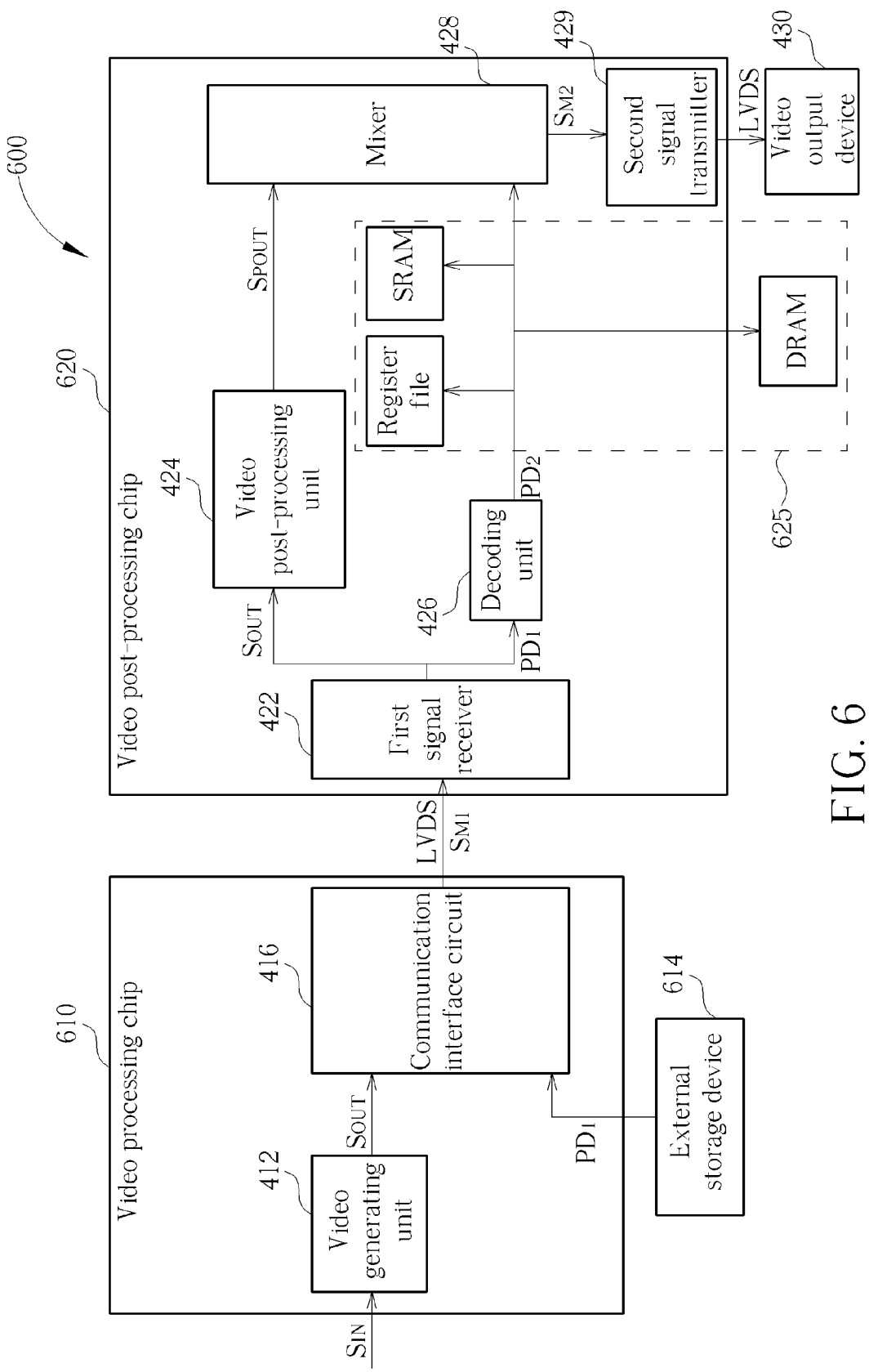
FIG. 6 is a diagram of a video processing circuit according to a third embodiment of the present disclosure.

FIG. 6 is a diagram of a video processing circuit 600 according to a third embodiment of the present disclosure. In FIG. 5, elements with the same reference numerals as that in FIG. 4 refer to the same elements, further detailed description is omitted herein. In this embodiment, the graphic generating unit is an external storage device 614 of a video processing chip 610, and a video post-processing chip 620 further includes a second storage device 625 coupled to the decoding unit 426. Please note that, the external storage device 614 is not disposed in the video processing chip 610, and acts as an external data source for storing and providing the graphical stream $PD_1$. In this case, the graphical stream $PD_1$ can be a table, an index, a program code, or other data used in certain video applications, but this is for illustrative purpose only and is not meant to be a limitation of the present disclosure. In this embodiment, the communication interface circuit 416 is in the second mode. The external storage device 614 provides the graphical stream $PD_1$ to the communication interface circuit 416, and the communication interface circuit 416 merges the video output stream $S_{OUT}$ and the graphical stream $PD_1$, such as a program code, to generate a first merged signal $S_{M1}$. After the first signal receiver 422 receives the first merged signal $S_{M1}$ and extracts the video output stream $S_{OUT}$ and the graphical stream $PD_1$ (i.e., the program code) from the first merged signal $S_{M1}$, the decoding unit 426 then decodes graphical stream $PD_1$ (i.e., the program code) to generate the decoded graphical stream $PD_2$ (i.e., a decoded program code). The graphical stream $PD_2$ is then stored into the second storage device 625. In one embodiment, the second storage device 625 can comprise, but not limited to, a DRAM, an SRAM, or a register file.

Please note that, the graphic generating unit 414 can be an internal element disposed in the video processing chip or an external element positioned outside the video processing chip. The graphical stream $PD_1$ can be an OSD data, a table, an index, a program code, or other data, but this for illustrative purpose only and is not meant to be a limitation of the present disclosure. It will be obvious to those skilled in the art that various modifications may be made without departing from the spirit of the present disclosure.

In the following embodiments, methods and operations about the communication interface circuit 416 merging the video output stream $S_{OUT}$ and the graphical stream $PD_1$ in the second mode are disclosed.

Figure 7:
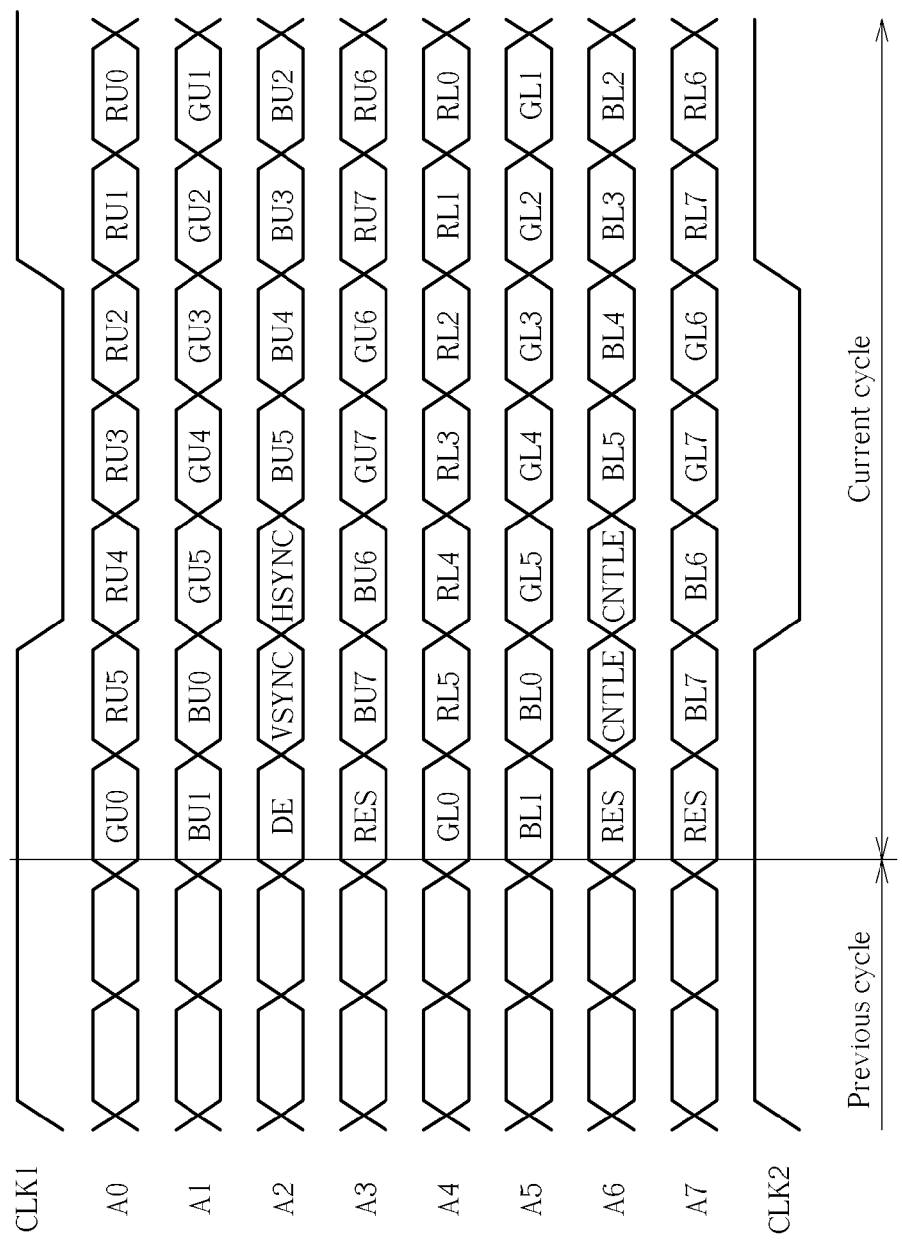
FIG. 7 is a diagram showing a conventional LVDS signal encoding.

Please refer to FIG. 7. FIG. 7 is a diagram showing a conventional LVDS signal encoding. As shown in FIG. 7, it represents an LVDS transmission for 8-bit RGB format and 2 channels. In each channel, 24 bits for R/G/B signals (each signal has 8 bits), 1 bit for Hsync control signal, 1 bit for Vsync control signal, 1 bit for data enable signal, and 1 reserved bit are included, which represent the video output stream $S_{OUT}$. Thus the LVDS transmission totally has 56 bits in these two channels. Assume that the LVDS transmission runs at 75 Hz (or 60 Hz for Full-HD) and all the signals are transmitted by buses A0-A8. During a cycle (such as the current cycle in FIG. 7), the bits GU0, RU5, . . . , RU1, and RU0 are transmitted by the bus A0, and the bits BU1, BU0, . . . , GU2, and GU0 are transmitted by the bus A1, and so on. Therefore, all the 56 bits can be transmitted during the current cycle through the LVDS transmission.

Figure 8:
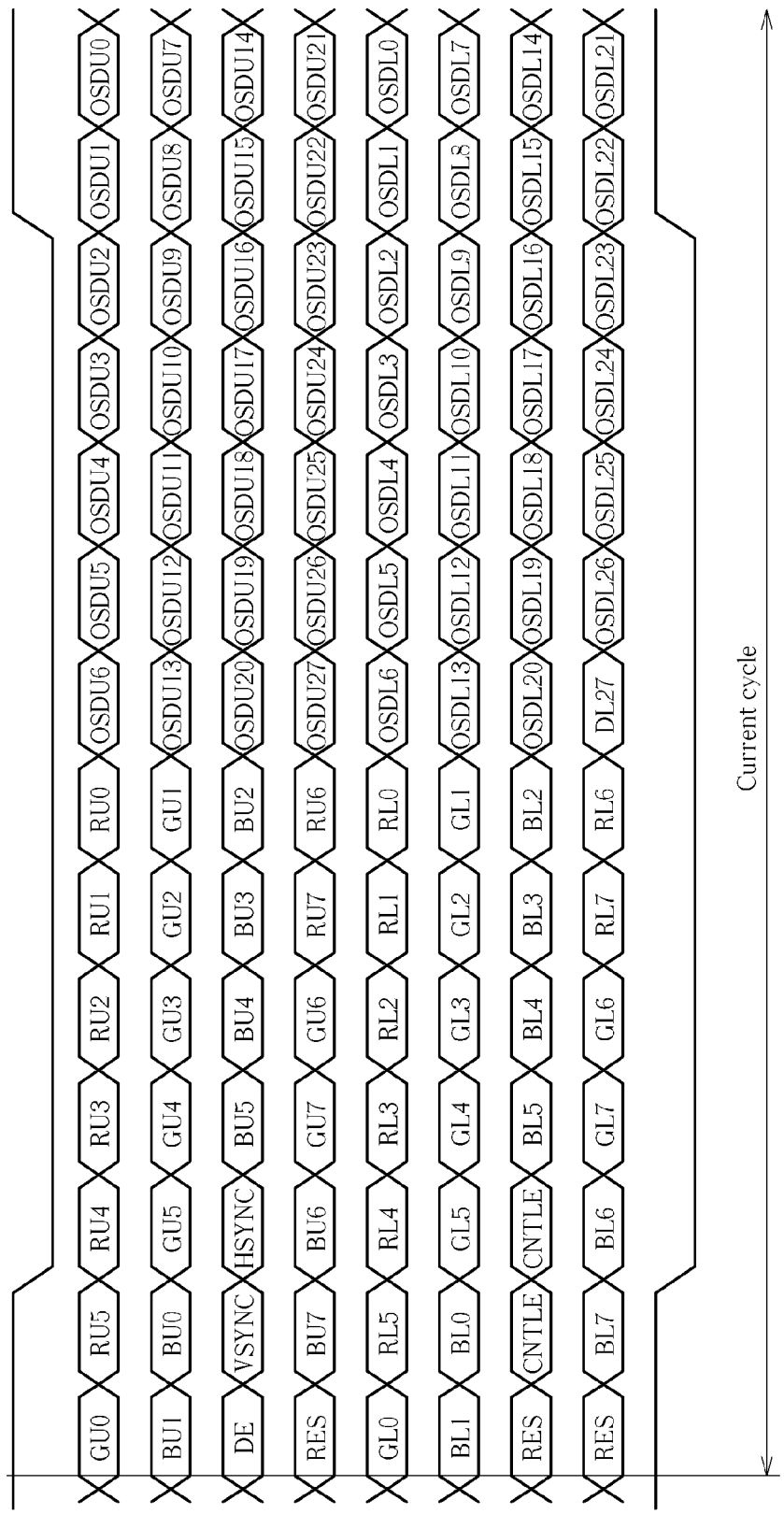
FIG. 8 is a diagram showing a first exemplary embodiment of a novel LVDS signal encoding according to the present disclosure.

Please refer to FIG. 8. FIG. 8 is a diagram showing a first exemplary embodiment of a novel LVDS signal encoding according to the present disclosure. As shown in FIG. 8, it represents an LVDS transmission for 8-bit RGB format and 2 channels. In FIG. 8, like the LVDS transmission in FIG. 7, each channel includes 28 bits and the LVDS transmission totally has 56 bits, which represent the video output stream $S_{OUT}$. In this embodiment, the communication interface circuit 416 is in the second mode and merges the video output stream $S_{OUT}$ and the graphical stream $PD_1$ by increasing a working frequency of the communication interface circuit 416 to increase a bandwidth of the channel LVDS. Assume that the LVDS transmission in FIG. 8 runs at 150 Hz and all the signals are transmitted by buses A0-A8. During a cycle (such as the current cycle in FIG. 8), totally 112 bits can be transmitted through the LVDS transmission due to running at 150 Hz. Therefore, besides the 56 bits of the video output stream $S_{OUT}$ can be transmitted through the LVDS transmission, the extra bandwidth induced by the boosted clock rate can be utilized for transmitting extra 56 bits data of the graphical stream $PD_1$ (marked as OSDU0-OSDU27 and OSDL0-OSDL27), such as an OSD data, table, index, or program code.

Figure 9:
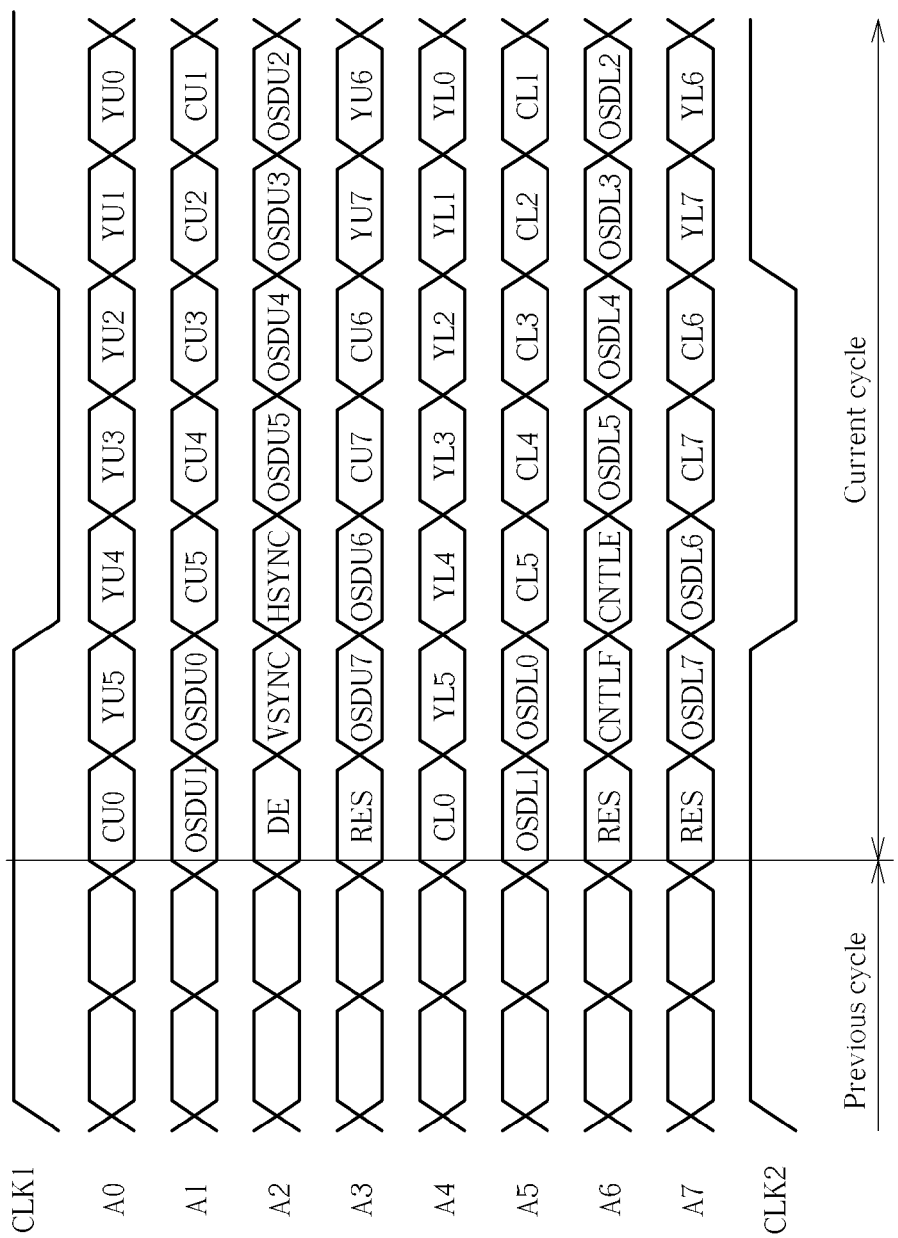
FIG. 9 is a diagram showing a second exemplary embodiment of the novel LVDS signal encoding according to the present disclosure.

Please refer to FIG. 9. FIG. 9 is a diagram showing a second exemplary embodiment of a novel LVDS signal encoding according to the present disclosure. As shown in FIG. 9, it represents an LVDS transmission for YC 4:2:2 format and 2 channels. In this embodiment, the communication interface circuit 416 is in the second mode and merges the video output stream $S_{OUT}$ and the graphical stream $PD_1$ by compressing the video output stream $S_{OUT}$. Each channel includes 8 bits for Y signal (i.e., a luminance signal) and 8 bits for C signal (i.e., a chrominance signal), 1 bit for Hsync signal, 1 bit for Vsync signal, 1 bit for data enable signal, and 1 reserved bit. Assume that the LVDS transmission also runs at 75 Hz (or 60 Hz for Full-HD) and all the signals are transmitted by buses A0-A8. During a cycle (such as the current cycle in FIG. 9), totally 56 bits can be transmitted through the LVDS transmission. However, the video output stream $S_{OUT}$ only has 40 bits to be transmitted through the LVDS transmission due to the employed YC 4:2:2 format, the spare bandwidth can be utilized for transmitting extra 16 bits data of the graphical stream $PD_1$ (marked as OSDU0-OSD7 and OSDL0-OSDL7).

Please note that, in the above-mentioned embodiment, the communication interface circuit 416 compresses the video output stream $S_{OUT}$ by transferring the video output stream $S_{OUT}$ from a first color depth format (R/G/B) to a second color depth format (Y/C). This embodiment is presented merely for describing features of the present disclosure, and in no way should be considered to be limitations of the scope of the present disclosure. For example, in other alternative designs, the communication interface circuit 416 can be configured to compress the video output stream $S_{OUT}$ by replacing actual color values of the video output stream $S_{OUT}$ with color indexes of the video output stream $S_{OUT}$, or transferring the video output stream $S_{OUT}$ into a packet format. Due to the operation of compressing the video output stream $S_{OUT}$ being well-known to those skilled in the art, it is not described in detail herein for brevity.

Figure 10:
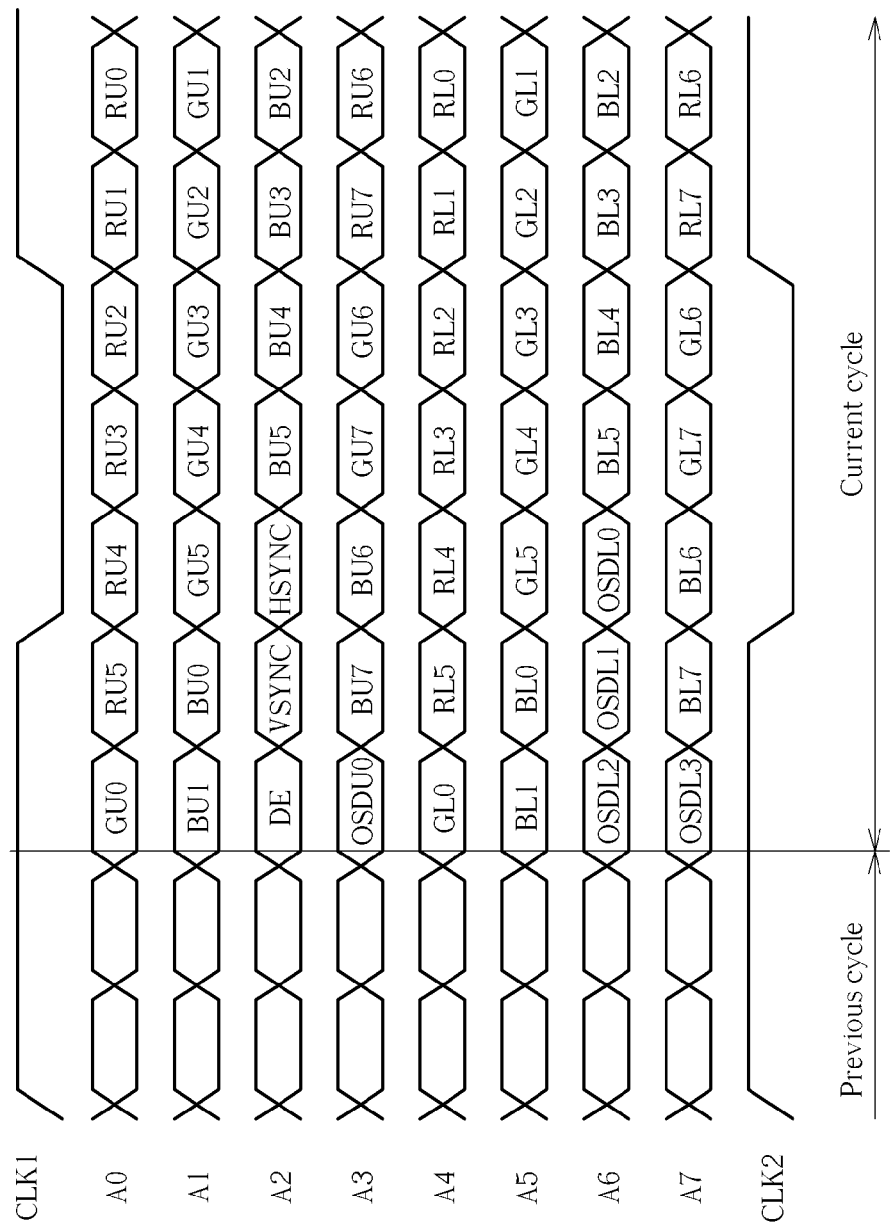
FIG. 10 is a diagram showing a third exemplary embodiment of the novel LVDS signal encoding according to the present disclosure.

Please refer to FIG. 10. FIG. 10 is a diagram showing a third exemplary embodiment of a novel LVDS signal encoding according to the present disclosure. As shown in FIG. 10, it represents an LVDS transmission for 8-bit RGB format and 2 channels. In this embodiment, the communication interface circuit 416 is in the second mode and merges the video output stream $S_{OUT}$ and the graphical stream $PD_1$ by using positions for transmitting a portion of video control signals in the video output stream $S_{OUT}$ to transmit the graphical stream $PD_1$. Each channel includes 24 bits for R/G/B (each signal has 8 bits), but only one channel needs to transmit the video control signals, e.g. 1 bit for Hsync control signal, 1 bit for Vsync control signal, 1 bit for data enable signal. Assume that the LVDS transmission also runs at 75 Hz (or 60 Hz for Full HD) and all the signals are transmitted by buses A0-A8. During a cycle (such as the current cycle in FIG. 9), totally 56 bits can be transmitted through the LVDS transmission. However, the video output stream $S_{OUT}$ only has 51 bits to be transmitted through the LVDS transmission, the spare bandwidth can be utilized for transmitting extra 5 bits data of the graphical stream $PD_1$ (marked as OSDU0 and OSDL0-OSDL3).

Please note that, although the above embodiments bring up three schemes as examples to introduce the spirit of the present disclosure, this is not meant to be limitations of the implementation of the present disclosure. Other embodiments obeying the spirit of the present invention are possible. For example, any combination of the abovementioned schemes shown in FIGS. 8-10 can be utilized, and this still falls in the scope of the present disclosure.

Figure 11:
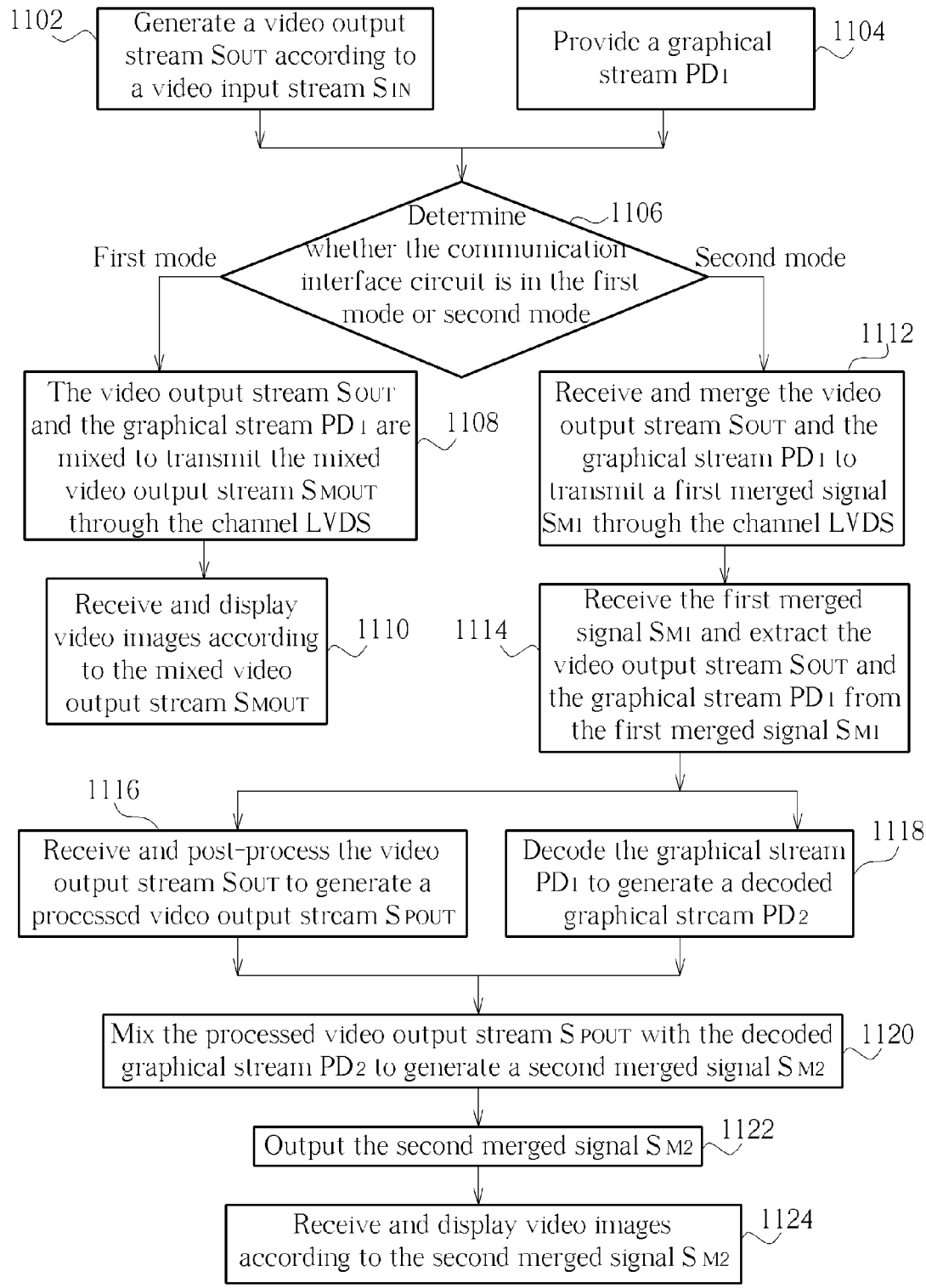
FIG. 11 is a flow chart of a method for merging video output streams with a data stream (e.g. a graphical stream) for transmission according to an embodiment of the present disclosure.

Please refer to FIG. 11. FIG. 11 is a flow chart of a method for merging video output streams with a data stream (e.g. a graphical stream) for transmission according to an embodiment of the present disclosure. The method includes the following steps:

Step 1102: Generate a video output stream $S_{OUT}$ according to a video input stream $S_{IN}$;

Step 1104: Provide a graphical stream $PD_1$;

Step 1106: Determine whether the communication interface circuit 416 is in the first mode or second mode. If the communication interface circuit 416 is in the first mode, process goes to step 1108; otherwise, process goes to step 1112.

Step 1108: The video output stream $S_{OUT}$ and the graphical stream $PD_1$ are mixed to transmit the mixed video output stream $S_{MOUT}$ through the channel LVDS.

Step 1110: Receive and display video images according to the mixed video output stream $S_{MOUT}$.

Step 1112: Receive and merge the video output stream $S_{OUT}$ and the graphical stream $PD_1$ to transmit a first merged signal $S_{M1}$ through the channel LVDS;

Step 1114: Receive the first merged signal $S_{M1}$ and extract the video output stream $S_{OUT}$ and the graphical stream $PD_1$ from the first merged signal $S_{M1}$;

Step 1116: Receive and post-process the video output stream $S_{OUT}$ extracted from the first merged signal $S_{M1}$ to generate a processed video output stream $S_{POUT}$;

Step 1118: Decode the graphical stream $PD_1$ to generate a decoded graphical stream $PD_2$;

Step 1120: Mix the processed video output stream $S_{POUT}$ with the decoded graphical stream $PD_2$ to generate a second merged signal $S_{M2}$;

Step 1122: Output the second merged signal $S_{M2}$; and

Step 1124: Receive and display video images according to the second merged signal $S_{M2}$.

Please refer to FIG. 4 in conjunction with FIG. 11. The video generating unit 412 generates the video output stream $S_{OUT}$ according to the video input signal $S_{IN}$ (Step 1102), and the graphic generating unit 414 provides the graphical stream $PD_1$ (Step 1104). At this time, whether the communication interface circuit 416 is in the first mode or the second mode is determined (Step 1106). In the following, the flow is divided into two cases for illustration. If the communication interface circuit 416 is in the first mode, the steps 1108-1110 are executed. If the communication interface circuit 416 is in the second mode, the steps 1112-1124 are executed. When the communication interface circuit 416 is in the first mode (as shown in 4A), the video output stream $S_{OUT}$ and the graphical stream $PD_1$ are mixed to transmit the mixed video output stream $S_{MOUT}$ through the channel LVDS (Step 1108), and then the video output device 530 receives and displays video images according to the mixed video output stream $S_{MOUT}$. When the communication interface circuit 416 is in the second mode (as shown in 4B), the communication interface circuit 416 receives and merges the video output stream $S_{OUT}$ and the graphical stream $PD_1$ to transmit the first merged signal $S_{M1}$ (Step 1112), and the first signal receiver 422 then receives the first merged signal $S_{M1}$ and extracts the video output stream $S_{OUT}$ and the graphical stream $PD_1$ from the first merged signal $S_{M1}$ (Step 1114). Afterwards, the video output stream $S_{OUT}$ extracted from the first merged signal $S_{M1}$ is received and post-processed by the video post-processing unit 424 to generate the processed video output stream $S_{POUT}$ (Step 1116), and the graphical stream $PD_1$ is decoded by the decoding unit 426 to generate the decoded graphical stream $PD_2$ (Step 1118). In Step 1120, the processed video output stream $S_{POUT}$ and the decoded graphical stream $PD_2$ are mixed by the mixer 428 to generate the second merged signal $S_{M2}$. Finally, the second merged signal $S_{M2}$ is outputted by the second signal transmitter 429 through an LVDS interface to the video output device 430 for displaying video images according to the second merged signal $S_{M2}$ (the steps 1122-1124).

Please note that, in Step 1112, the video output stream $S_{OUT}$ and the graphical stream $PD_1$ are merged by increasing a working frequency of the communication interface circuit 416 to increase a bandwidth of the channel, by using positions for transmitting a portion of video control signals in the video output stream $S_{OUT}$ to transmit the graphical stream $PD_1$, by compressing the video output stream, or any combination of the abovementioned operations. The detail description has already been disclosed in the above-mentioned embodiments (FIG. 8-FIG. 10), and further detailed description is omitted herein for the sake of brevity. In addition, the operation of compressing the video output stream $S_{OUT}$ can be performed by transferring the video output stream $S_{OUT}$ from a first color depth format to a second color depth format, replacing actual color values of the video output stream with color indexes of the video output stream, or transferring the video output stream into a packet format (see the embodiment in FIG. 9). This is only a preferred embodiment for describing the present disclosure and is not meant to be a limitation of the present disclosure. Although specific embodiments have been illustrated and described, it will be obvious to those skilled in the art that other modified designs obeying the spirit of the disclosure are possible and also fall into the scope of the disclosure.

Figure 12:
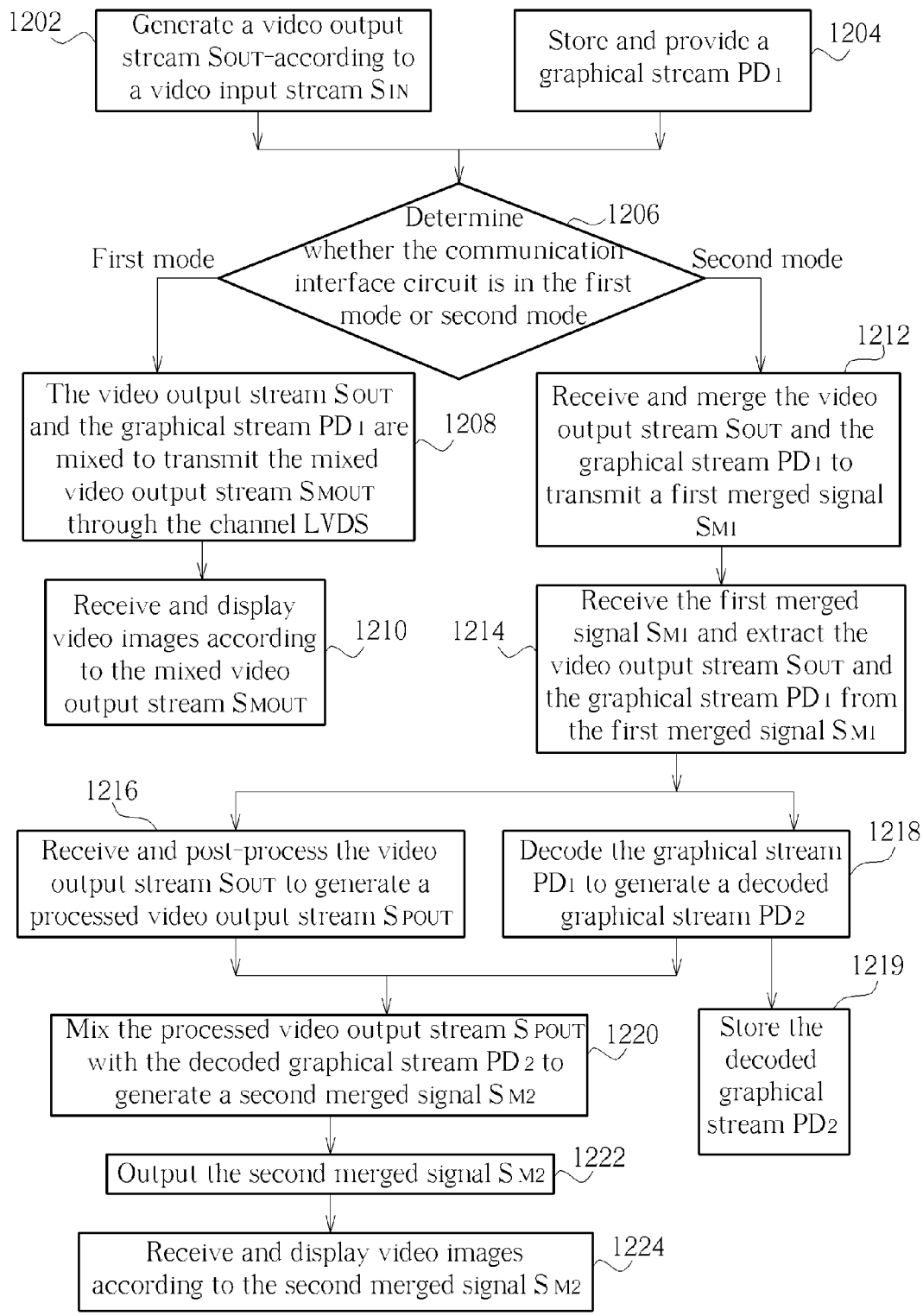
FIG. 12 is a flow chart of a method for merging video output streams with a data stream (e.g. a graphical stream) for transmission according to another embodiment of the present disclosure.

Please refer to FIG. 12. FIG. 12 is a flow chart of a method for merging video signals with a data stream (e.g. a graphical stream) for transmission according to another embodiment of the present disclosure. The method includes, but is not limited to, the following steps:

Step 1202: Generate a video output stream $S_{OUT}$ according to a video input stream $S_{IN}$;

Step 1204: Store and provide a graphical stream $PD_1$;

Step 1206: Determine whether the communication interface circuit 416 is in the first mode or second mode. If the communication interface circuit 416 is in the first mode, process goes to step 1208; otherwise, process goes to step 1212.

Step 1208: The video output stream $S_{OUT}$ and the graphical stream $PD_1$ are mixed to transmit the mixed video output stream $S_{POUT}$ through the channel LVDS.

Step 1210: Receive and display video images according to the mixed video output stream $S_{POUT}$.

Step 1212: Receive and merge the video output stream $S_{OUT}$ and the graphical stream $PD_1$ to transmit a first merged signal $S_{M1}$;

Step 1214: Receive the first merged signal $S_{M1}$ and extract the video output stream $S_{OUT}$ and the graphical stream $PD_1$ from the first merged signal $S_{M1}$;

Step 1216: Receive and post-process the video output stream $S_{OUT}$ extracted from the first merged signal $S_{M1}$ to generate a processed video output stream $S_{POUT}$;

Step 1218: Decode the graphical stream $PD_1$ to generate a decoded graphical stream $PD_2$;

Step 1219: Store the decoded graphical stream $PD_2$;

Step 1220: Mix the processed video output stream $S_{POUT}$ with the decoded graphical stream $PD_2$ to generate a second merged signal $S_{M2}$;

Step 1222: Output the second merged signal $S_{M2}$; and

Step 1224: Receive and display video images according to the second merged signal $S_{M2}$.

Please refer to FIG. 6 in conjunction with FIG. 12, and compare FIG. 11 with FIG. 12. The difference between FIG. 11 and FIG. 12 is described in the following. In Step 1204, the graphical stream $PD_1$ is stored and provided by the external storage device 614. In this case, the external storage device 614 can be a DRAM and is not disposed in the video processing chip 610. Thus the graphical stream $PD_1$ can be a table, an index, or a program code stored in the external storage device 610. But in Step 1104 of FIG. 11, the graphical stream $PD_1$ is provided by the graphic generating unit 414, which is disposed in the video processing chip 610. In the steps 1218-1219, the graphical stream $PD_1$ is decoded by the decoding unit 426 to generate a decoded graphical stream $PD_2$, and the decoded graphical stream $PD_2$ is then stored into the second storage device 625, whereof the second storage device 625 can be a SRAM, a DRAM, or a register file. But in Step 1112 of FIG. 11, graphical stream $PD_2$ is not stored.

The abovementioned embodiments are presented merely for describing features of the present disclosure, and in no way should be considered to be limitations of the scope of the present disclosure. In the above embodiments, the first merged signal $S_{M1}$ and the second merged signal $S_{M2}$ are transmitted through an LVDS interface, but this is for illustrative purpose only and is not meant as a limitation of the present disclosure. The first merged signal $S_{M1}$ and the second merged signal $S_{M2}$ can be transmitted through other interfaces, e.g. a transistor-transistor logic (TTL) interface. In addition, the communication interface circuit 416 can be operated in the first mode or the second mode. The first mode is provided for mixing the video output stream $S_{OUT}$ and the graphical stream $PD_1$ to transmit the mixed video output stream $S_{MOUT}$ through the channel LVDS, and the video processing chip 410 is directly coupled to a video output device 530. The second mode is provided for merging the video output stream $S_{OUT}$ and the graphical stream $PD_1$ to transmit a first merged signal $S_{M1}$ through the channel LVDS, and the video processing chip 410 is coupled to a post-processing chip 420 and then coupled to the video output device 430. Please note that, the graphic generating unit 414 can be an on-screen display (OSD) encoder disposed in the video processing chip 410, an external storage device of the video processing chip 410, or other elements, and is not limited to them only. In addition, the graphical stream $PD_1$ can be an OSD data, a table, an index, a program code, or other data, but this for example only and is not meant as a limitation of the present disclosure. Please note that again, in above embodiments, the video output stream $S_{OUT}$ and the graphical stream $PD_1$ are merged by increasing a working frequency of the communication interface circuit 416 to increase a bandwidth of the channel, by using positions for transmitting a portion of video control signals in the video output stream $S_{OUT}$ to transmit the graphical stream $PD_1$, by compressing the video output stream, or any combination of the abovementioned operations. In addition, the operation of compressing the video output stream $S_{OUT}$ can be performed by transferring the video output stream $S_{OUT}$ from a first color depth format to a second color depth format, replacing actual color values of the video output stream with color indexes of the video output stream, or transferring the video output stream into a packet format. This is only a preferred embodiment for describing the present disclosure and is not meant to be a limitation of the present disclosure.

In summary, the present disclosure provides a processing system and related method for merging video output streams with a data stream (e.g. a graphical stream) for transmission. In the second mode, due to the video output stream $S_{OUT}$ and the graphical stream $PD_1$ being merged by the communication interface circuit 416 for transmission, no extra I/O pins are needed to transmit the graphical stream $PD_1$, which is economical for cost. In addition, only the video output stream $S_{OUT}$ extracted from the first merged signal $S_{M1}$ is post-processed by the video post-processing unit 424, therefore, not only the video quality of the video output stream $S_{OUT}$ is enhanced but also the quality around the graphical stream $PD_1$ area maintains good. Furthermore, the graphical stream $PD_1$ in various types can be transmitted through the video processing circuit of the present disclosure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing circuit, comprising:
   a video generating unit for generating a video output stream according to a video input stream;
   a data generating unit for providing a data stream; and
   a communication interface circuit, coupled to the video generating unit and the data generating unit, the communication interface circuit having a mode provided for merging the video output stream and the data stream to transmit a first merged signal through a channel, wherein in the mode, a first part of bandwidth of the channel is utilized for transmitting the video output stream and a second part of bandwidth of the channel is utilized for transmitting the data stream;
   wherein in the mode, the communication interface circuit merges the video output stream and the data stream by compressing the video output stream.

2. The video processing circuit of claim 1, further comprising:
   a post-processing device, coupled to the communication interface circuit, for receiving the first merged signal through the channel in the mode.

3. The video processing circuit of claim 1, wherein the communication interface circuit compresses the video output stream by:
transferring the video output stream from a first color depth format to a second color depth format;
replacing actual color values of the video output stream with color indexes of the video output stream; or
transferring the video output stream into a packet format.

4. The video processing circuit of claim 1, wherein the communication interface circuit is a low voltage differential signal (LVDS) interface circuit.

5. The video processing circuit of claim 1, wherein data stream comprises an on-screen display (OSD) data and the data generating unit is an on-screen display (OSD) encoder.

6. The video processing circuit of claim 1, further comprising:
a first signal receiver, coupled to the communication interface circuit, for receiving the first merged signal and extracting the video output stream and the data stream from the first merged signal;
a video post-processing unit, coupled to the first signal receiver, for receiving and post-processing the video output stream extracted from the first merged signal to generate a processed video output stream;
a decoding unit, coupled to the first signal receiver, for decoding the data stream to generate a decoded data stream;
a mixer, coupled to the video post-processing unit and the decoding unit, for mixing the processed video output stream with the decoded data stream to generate a second merged signal; and
a second signal transmitter, coupled to the mixer, for outputting the second merged signal.

7. The video processing circuit of claim 1, wherein the communication interface circuit has another mode provided for mixing the video output stream and the data stream to transmit a mixed video output stream through the channel, wherein in the other mode, bandwidth of the channel is used for transmitting the mixed video output stream.

8. A video processing circuit, comprising:
a video generating unit for generating a video output stream according to a video input stream;
a data generating unit for providing a data stream; and
a communication interface circuit, coupled to the video generating unit and the data generating unit, the communication interface circuit having a mode provided for merging the video output stream and the data stream to transmit a first merged signal through a channel, wherein in the mode, a first part of bandwidth of the channel is utilized for transmitting the video output stream and a second part of bandwidth of the channel is utilized for transmitting the data stream;
wherein in the mode, the communication interface circuit merges the video output stream and the data stream by increasing a working frequency of the communication interface circuit to increase a bandwidth of the channel.

9. The video processing circuit of claim 8, further comprising:
a post-processing device, coupled to the communication interface circuit, for receiving the first merged signal through the channel in the mode.

10. The video processing circuit of claim 8, wherein the communication interface circuit is a low voltage differential signal (LVDS) interface circuit.

11. The video processing circuit of claim 8, further comprising:
a first signal receiver, coupled to the communication interface circuit, for receiving the first merged signal and extracting the video output stream and the data stream from the first merged signal;
a video post-processing unit, coupled to the first signal receiver, for receiving and post-processing the video output stream extracted from the first merged signal to generate a processed video output stream;
a decoding unit, coupled to the first signal receiver, for decoding the data stream to generate a decoded data stream;
a mixer, coupled to the video post-processing unit and the decoding unit, for mixing the processed video output stream with the decoded data stream to generate a second merged signal; and
a second signal transmitter, coupled to the mixer, for outputting the second merged signal.

12. The video processing circuit of claim 8, wherein the communication interface circuit has another mode provided for mixing the video output stream and the data stream to transmit a mixed video output stream through the channel, wherein in the other mode, bandwidth of the channel is used for transmitting the mixed video output stream.

13. A video processing circuit, comprising:
a video generating unit for generating a video output stream according to a video input stream;
a data generating unit for providing a data stream; and
a communication interface circuit, coupled to the video generating unit and the data generating unit, the communication interface circuit having a mode provided for merging the video output stream and the data stream to transmit a first merged signal through a channel, wherein in the mode, a first part of bandwidth of the channel is utilized for transmitting the video output stream and a second part of bandwidth of the channel is utilized for transmitting the data stream;
wherein in the mode, the communication interface circuit merges the video output stream and the data stream by using positions for transmitting a portion of video control signals in the video output stream to transmit the data stream.

14. The video processing circuit of claim 13, further comprising:
a post-processing device, coupled to the communication interface circuit, for receiving the first merged signal through the channel in the mode.

15. The video processing circuit of claim 13, wherein the communication interface circuit is a low voltage differential signal (LVDS) interface circuit.

16. The video processing circuit of claim 13, wherein data stream comprises an on-screen display (OSD) data and the data generating unit is an on-screen display (OSD) encoder.

17. The video processing circuit of claim 13, further comprising:
a first signal receiver, coupled to the communication interface circuit, for receiving the first merged signal and extracting the video output stream and the data stream from the first merged signal;
a video post-processing unit, coupled to the first signal receiver, for receiving and post-processing the video output stream extracted from the first merged signal to generate a processed video output stream;
a decoding unit, coupled to the first signal receiver, for decoding the data stream to generate a decoded data stream;

a mixer, coupled to the video post-processing unit and the decoding unit, for mixing the processed video output stream with the decoded data stream to generate a second merged signal; and a second signal transmitter, coupled to the mixer, for outputting the second merged signal.

18. The video processing circuit of claim 17, further comprising:

a video output device, coupled to the second signal transmitter, for receiving the second merged signal and displaying video images according to the second merged signal.

19. The video processing circuit of claim 13, wherein the communication interface circuit has another mode provided for mixing the video output stream and the data stream to transmit a mixed video output stream through the channel, wherein in the other mode, bandwidth of the channel is used for transmitting the mixed video output stream.

20. A method for merging video output streams with a data stream for transmission, the method comprising:

generating a video output stream according to a video input stream;

providing a data stream; and providing a mode for merging the video output stream and the data stream to transmit a first merged signal to a post-processing chip through a channel, wherein in the mode, a first part of bandwidth of the channel is utilized for transmitting the video output stream and a second part of bandwidth of the channel is utilized for transmitting the data stream;

wherein in the mode, the step of merging the video output stream and the data stream comprises using positions for transmitting a portion of video control signals in the video output stream to transmit the data stream.

21. The method of claim 20, wherein in the mode, the step of merging the video output stream and the data stream comprises:

using positions for transmitting a portion of video control signals in the video output stream to transmit the data stream.

22. The method of claim 20, further comprising:

receiving the first merged signal and extracting the video output stream and the data stream from the first merged signal;

receiving and post-processing the video output stream extracted from the first merged signal to generate a processed video output stream;

decoding the data stream to generate a decoded data stream;

mixing the processed video output stream with the decoded data stream to generate a second merged signal; and outputting the second merged signal.

23. The method of claim 20, further comprising:

providing another mode for mixing the video output stream and the data stream to transmit a mixed video output stream through the channel, wherein in the other mode, bandwidth of the channel is used for transmitting the mixed video output stream.

* * * * *